J. A. Dickson,
Cattle Pump.
N° 44,289.  Patented Sep. 20, 1864.
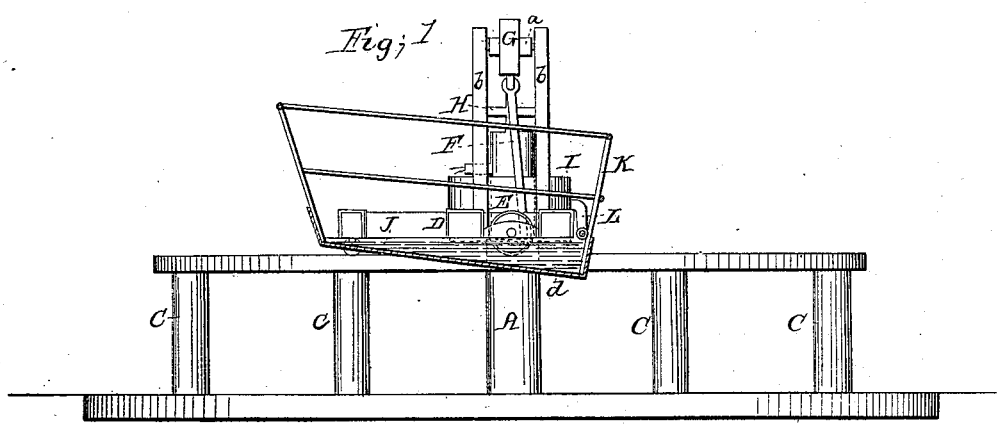
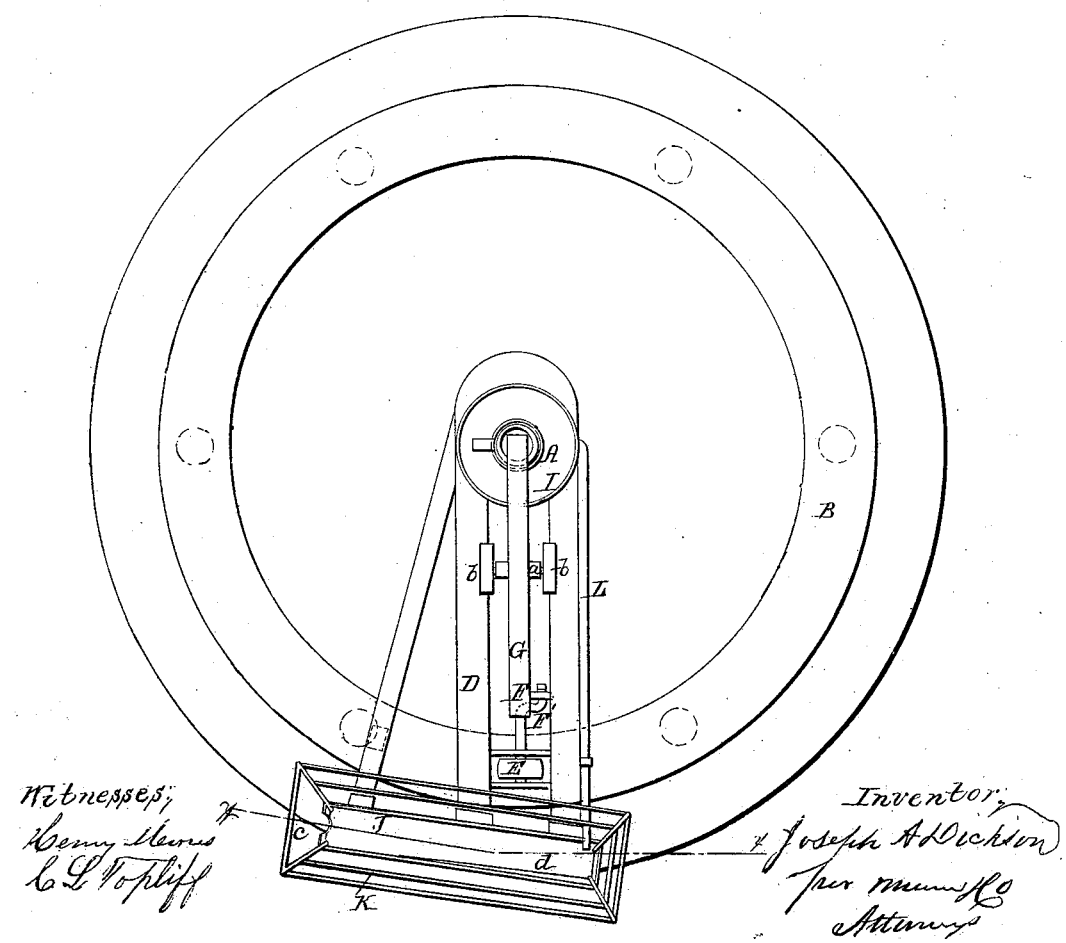

UNITED STATES PATENT OFFICE.

JOSEPH A. DICKSON, OF SANDWICH, ILLINOIS.

IMPROVEMENT IN CATTLE-PUMPS.

Specification forming part of Letters Patent No. 44,289, dated September 20, 1864.

*To all whom it may concern:*

Be it known that I, JOSEPH A. DICKSON, of Sandwich, in the county of De Kalb and State of Illinois, have invented a new and Improved Cattle-Pump; and I do hereby declare that the following is a full, clear, and exact description thereof, which will enable others skilled in the art to fully understand and construct the same, reference being had to the accompanying drawings, making a part of this specification, in which—

Figure 1 is a side view of my invention, the trough being in section, as indicated by the line $x\ x$, Fig. 2; Fig. 2, a plan or top view of the same.

Similar letters of reference indicate like parts.

This invention relates to a new and improved pump by which cattle themselves may pump up at will the water they require for drinking purposes.

A represents the trunk or stock of an ordinary suction or force pump.

B is an elevated annular way, which is placed around the trunk or stock A, concentric therewith, and supported by posts C.

D is a frame, one end of which rests on the trunk or stock A, and is allowed to turn freely thereon. In this frame D, near its outer end, there is a roller, E, which rests upon the way B, and this roller is connected by a pitman and crank, F F', with the outer end of a walking-beam, G, the shaft $a$ of which has its bearings in uprights $b\ b$ on the frame D. The inner end of the walking-beam G is connected to the piston-rod H of the pump.

I is a circular water-receptacle, which is placed on the inner part of the frame D, the trunk or stock A of the pump passing through the center of I.

J is a trough, which is attached to the outer end of the frame D, and has a guard or fender, K, attached, extending all around it, an opening, $c$, being at one end to admit of the animal inserting its head through the fender to reach the trough.

L is a tube, which extends from the water-receptacle to the trough J. The latter has an inclined bottom, $d$, which makes the trough deeper at the end opposite to that where the opening $c$ is made in the fender K. The trough J projects beyond the outer edge of the annular way B, so that the former will be accessible to the animals.

The operation is as follows: An animal approaches the trough and inserts its head through the opening $c$ in the trough, and in endeavoring to reach the back and deep part of the trough, where some water in the first instance may be placed, moves the frame D around the roller E and pitman F and crank F', communicating motion to the walking-beam, and the latter operating the piston of the pump, the water being discharged into the receptacle I and passing therefrom through tube L into the trough J.

Most animals will operate the pump at once without being taught.

I would remark that in lieu of the roller E a pinion may be used, and a circular rack attached to the way B for the pinion to gear into. This would insure the operating of the pump at all times when the frame D is moved; but the roller E will probably answer, as there will be considerable friction between the roller and way.

It would be clearly within the nature of my invention to substitute buckets or other device for raising water, as my invention has nothing to do with any kind of device for raising water, but solely with the means of operating the device, whatever it may be, by the voluntary action of the animal pressing against the frame or trough, with its connections for carrying the water within reach of the animal while operating the same.

If buckets or other device than the ordinary pump is used, it may be necessary to have a pulley with rotary motion instead of the crank, in which case the crank may be dispensed with and the arrangements so changed as to adapt them to the use of pulleys instead of the crank.

Having thus described my invention, I claim as new and desire to secure by Letters Patent—

1. The radius-frame D, provided with the trough J, and connected with a pump or any suitable water-elevator in such a manner that the animal in its effort to drink will rotate the frame, and thereby actuate the pump and supply the trough with water, substantially as set forth.

2. The way B, in connection with the frame D, provided with the water-receptacle I and trough J, or its equivalent, communicating with each other by a trough or tube L, all arranged to operate substantially as and for the purpose specified.

JOSEPH A. DICKSON.

Witnesses:
S. B. STINSON,
JAMES WOODWARD.